No. 805,829. PATENTED NOV. 28, 1905.
C. G. WRISBERG.
LOCK NUT.
APPLICATION FILED APR. 6, 1905.
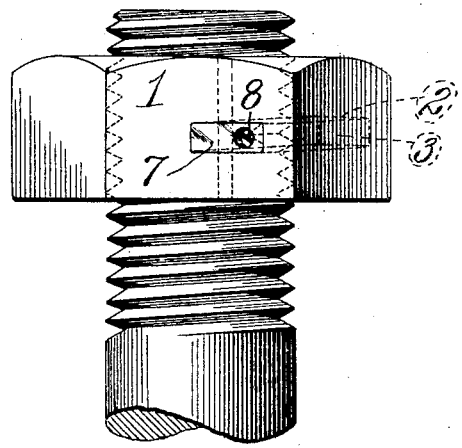
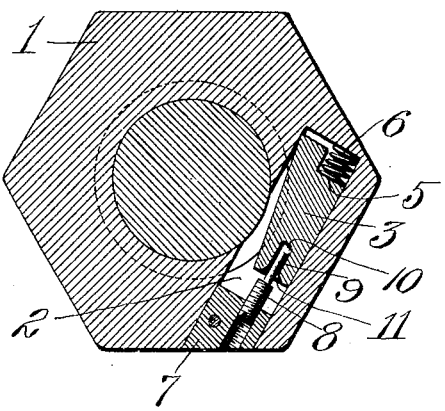 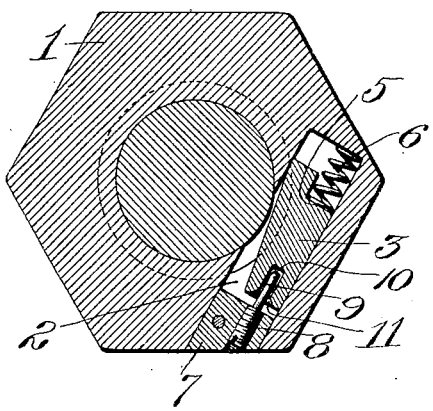
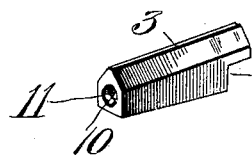 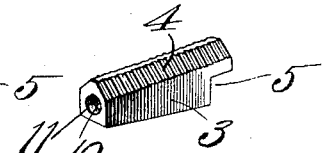
Witnesses:
Inventor:
Charles George Wrisberg
by J. D. Rippey
atty.

UNITED STATES PATENT OFFICE.

CHARLES GEORGE WRISBERG, OF ST. LOUIS, MISSOURI.

LOCK-NUT.

No. 805,829.  Specification of Letters Patent.  Patented Nov. 28, 1905.

Application filed April 6, 1905. Serial No. 254,122.

*To all whom it may concern:*

Be it known that I, CHARLES GEORGE WRISBERG, a citizen of the United States, residing at St. Louis, Missouri, have invented a new and useful Lock-Nut, of which the following is a specification.

This invention relates to lock-nuts; and its object is to provide, in combination with a nut, a lock device comprising a spring-actuated lock member located within a cavity in the nut and arranged to engage with the threads of the bolt when in locked position, and thereby prevent the rotation or turning of the nut or bolt relatively.

In the drawings, which form part of this specification, Figure 1 shows a nut embodying my invention locked in position. Fig. 2 is a cross-sectional view of the nut, showing the locking mechanism when held inoperative. Fig. 3 is a corresponding view illustrating the locking mechanism when in position to lock the nut on a bolt. Fig. 4 is a view of the lock member removed from the nut. Fig. 5 is a view showing a lock member of a slightly-modified construction.

The nut 1 may be of any shape or size, the only requirement being that it be of sufficient size to permit a recess or cavity 2 to be formed therein. The recess or cavity 2 is at one side but leads into and beyond one side of the bore and cuts away a portion of wall and threads of the bore, as may be fully understood by reference to Figs. 2 and 3. Within the recess or cavity 2 is located a locking member 3, the innermost end of which is of about equal width with the cavity. That edge of the member 3 which is toward the bore or bolt when the nut is in use is inclined, as shown, so that the outer end of the said member is of considerably less thickness than the inner end. The edge of the locking member 3 which is toward the bore or bolt is wedge-shaped, so as to fit between the threads of the bolt when applied. The sides of the wedge portion may be serrated or knurled, as shown at 4 in Fig. 5, or may be left smooth, as shown in Fig. 4. The opposite or outer wall of the member 3 is arranged to fit against the wall of the cavity 2, so that the said member will be firmly held in position and oscillation thereof prevented. A notch or cavity 5 is preferably formed in the inner end of the member 3, forming a seat for a spring 6, which is located in the cavity 2 in the nut and actuates the locking member outward.

As applied in use the nut 1 is screwed to its proper position on the bolt while the member 3 is being held repressed within the cavity 2, as shown in Fig. 2. The member 3 is pushed back and held back against the tension of the spring 6 to position that will permit the nut to be turned on the bolt without the threads of the bolt rubbing against the edge of the said member 3. After the nut has been screwed home the member 3 is released and the spring 6 exerts itself to force the said member outward, wedging the wedge-shaped edge thereof between the threads of the bolt. Because of the gradual inclination of the wedge side of the member 3 the tension of the spring is sufficient to bind the member very firmly between the threads of the bolt, and it will only release itself when pressure is applied to the outer end in parallel line with the straight outer wall of the locking member and the cavity in which it rests. The friction between the locking member and the wall of the cavity in which it rests becomes greater when any pressure is applied to the wedge side of the locking member, as occurs when attempt is made to turn the nut after the locking member once engages with the threads of the bolt. Furthermore, the threads always run spirally, while the locking member 3 extends directly transversely of the bolt, and hence any attempt to turn the nut in either direction will cause the wedge member to bind closely against the upper or lower wall of the cavity, depending upon the direction it is attempted to turn the nut. Therefore to remove the nut with the member 3 in engagement with the bolt-threads would require the member 3 to cut away entirely all the threads of the bolt, as well as a portion of the bolt proper, which for well-understood reasons is impossible.

To control the member 3 as required to permit application or release of the nut, I locate a block 7 in the open end of the cavity and a screw 8 in a threaded hole in the block. The screw 8 has a spindle 9 on its inner end, which projects into a hole 10 in the end of the member 3, said hole being larger than the spindle, so that the said member 3 may have free lateral movement so far as the spindle is concerned. The spindle 9 is parallel with the outer edge of the member 3, so that when the member is locked with the bolt the screw 8 by being turned will cause the spindle 9 to push the member backward out of engagement with the bolt. The screw 8 is so adjusted when it is desired to apply the nut in order that the nut may be freely turned without interference from the member 3. After the nut is screwed home the screw 8 is turned to release the member 3, and the spring 6 then acts to engage the said member with the bolt. Preferably the entrance to the hole 10 is enlarged, as indicated at 11, to insure entrance of the spindle in first adjustment of the parts.

I am aware that many variations and alterations of the parts or their combination may be made—such, for example, as locating two or more of the locks in one nut. This and other variations I have contemplated, and they may be embodied in devices of this class without in the least departing from the nature and principle of my invention.

Having described my invention, what I claim as new, and desire to secure by Letters Patent, is—

1. A nut having a cavity extending transversely of its bore, a locking member located within said cavity, said locking member being provided on one end with a notch 5, and on the opposite end with a hole 10, the entrance to said hole being larger than the remaining portion, a block 7 having a threaded hole therein fastened in the entrance of the cavity in the nut, a screw operatively located in said threaded hole, said screw having a spindle of smaller diameter than the hole 10 extending into said hole, and a spring having one end bearing in the said notch 5 and the opposite end against the wall of the cavity in the nut, substantially as specified.

2. A nut having a cavity extending transversely of its bore, the outer wall of the cavity being a plane, a locking member having a hole in one end, located within said cavity and bearing against the said outer wall of the cavity, a spring against the end of the locking member which is opposite from the hole, a block fastened in the entrance of the cavity, and a screw operatively carried by said block and having a spindle of smaller diameter than the hole in the locking member, projecting into said hole, substantially as specified.

3. A nut having a cavity extending transversely of its bore, a locking member located within and bearing closely against the outer wall of said cavity, said locking member being provided on one end with a notch 5, and on the opposite end with a hole 10, extending parallel with the outer edge of the locking member, a block secured in the entrance of the cavity in the nut, and a screw operatively carried by said block, and said screw having a spindle of smaller diameter than the hole 10, extending into said hole, substantially as described.

4. A nut having a cavity extending transversely of its bore, a locking member located within and bearing closely against the outer wall of said cavity, said locking member being provided on one end with a hole 10, a block secured in the entrance of the cavity and having a hole therein in alinement with the hole in the locking member, a movable member located in said hole formed in said block and projecting into the hole 10 in the locking member, and a spring against the end of the locking member, which is opposite from the hole 10, substantially as shown and described.

In testimony whereof I have signed my name to this specification in the presence of two subscribing witnesses.

CHARLES GEORGE WRISBERG.

Witnesses:
 WILLIAM C. WRISBERG,
 FREDERICK WILLIAM DUENCKEL